United States Patent
Paquette et al.

(10) Patent No.: US 11,114,267 B2
(45) Date of Patent: Sep. 7, 2021

(54) SINGLE HAND CONTROLLER

(71) Applicant: Measurement Systems, Inc., Wallingford, CT (US)

(72) Inventors: Raymond J. Paquette, Wallingford, CT (US); Robert A. Blain, Wallingford, CT (US); Jeffrey D. Philips, Wallingford, CT (US); Edward A. Schuler, Hamden, CT (US)

(73) Assignee: Measurement Systems, Inc., Wallingford, CT (US)

( * ) Notice: Subject to any disclaimer, the term of this patent is extended or adjusted under 35 U.S.C. 154(b) by 0 days.

(21) Appl. No.: 16/589,327

(22) Filed: Oct. 1, 2019

(65) Prior Publication Data

US 2020/0111635 A1    Apr. 9, 2020

Related U.S. Application Data

(60) Provisional application No. 62/742,087, filed on Oct. 5, 2018.

(51) Int. Cl.
| | |
|---|---|
| *A63F 13/00* | (2014.01) |
| *H01H 89/00* | (2006.01) |
| *G05D 1/00* | (2006.01) |
| *G05G 9/047* | (2006.01) |
| *G05G 1/01* | (2008.04) |

(52) U.S. Cl.
CPC ........... *H01H 89/00* (2013.01); *G05D 1/0016* (2013.01); *G05G 1/01* (2013.01); *G05G 9/047* (2013.01); *G05G 2009/04774* (2013.01); *H01H 2221/012* (2013.01); *H01H 2225/03* (2013.01)

(58) Field of Classification Search
None
See application file for complete search history.

(56) References Cited

U.S. PATENT DOCUMENTS

| 4,061,988 A | 12/1977 | Lweandowski | |
|---|---|---|---|
| 4,552,360 A * | 11/1985 | Bromley | A63F 13/06 463/38 |

(Continued)

FOREIGN PATENT DOCUMENTS

EP        2952234 A1    12/2015

OTHER PUBLICATIONS

Switches, Grips and Operator Control Modules, OTTO Product Catalog 113 (2016). www.gsglobalresources.com/uploads/OTTO_catalog.pdf p. 24, 26, 27.

(Continued)

*Primary Examiner* — Paul A D'Agostino
(74) *Attorney, Agent, or Firm* — Wiggin and Dana LLP; Gregory S. Rosenblatt

(57) ABSTRACT

A single hand controller including a front surface and a back surface, with a first and second side surface there between and an upper surface and bottom surface. The upper surface includes a joystick, and the front surface has a proportional plunger and one or more switches. The controller is grasped by placing a user's finger tips on the front surface, with user's index finger operating the proportional plunger and remaining fingers operating the switches. The thenar eminence group of muscles of the user's hand rests against the back surface, whereby the user's thumb is disposed so as to operate the joystick.

22 Claims, 13 Drawing Sheets

(56) References Cited

U.S. PATENT DOCUMENTS

| | | | |
|---|---|---|---|
| 4,825,157 A | | 4/1989 | Mikan |
| D331,044 S | * | 11/1992 | Tse ................ D14/416 |
| 5,644,113 A | | 7/1997 | Date et al. |
| 5,923,317 A | | 7/1999 | Sayler et al. |
| D431,604 S | | 10/2000 | Chan |
| 6,281,883 B1 | * | 8/2001 | Barker ............ G06F 3/03549 |
| | | | 345/169 |
| 6,459,058 B1 | | 10/2002 | Shinohe et al. |
| D533,142 S | | 12/2006 | Chen et al. |
| D589,465 S | * | 3/2009 | Ozoe ................ D13/171 |
| 10,324,487 B2 | * | 6/2019 | Parazynski .......... G05G 1/02 |
| 10,331,233 B2 | * | 6/2019 | Parazynski .......... G08B 5/36 |
| 10,520,973 B2 | * | 12/2019 | Parazynski .......... G05G 1/02 |
| 10,675,546 B2 | * | 6/2020 | Muramatsu .......... A63F 13/98 |
| 2001/0020934 A1 | | 9/2001 | Fukuda |
| 2005/0150750 A1 | | 7/2005 | Huang |
| 2005/0197178 A1 | * | 9/2005 | Villegas ............ F41A 33/00 |
| | | | 463/5 |
| 2008/0119269 A1 | | 5/2008 | Nonaka |
| 2010/0117953 A1 | | 5/2010 | Stute |
| 2010/0304868 A1 | | 12/2010 | Zalewski |
| 2015/0084900 A1 | * | 3/2015 | Hodges ............ G06F 1/1632 |
| | | | 345/173 |
| 2016/0279514 A1 | * | 9/2016 | Fung ............... A63F 13/31 |
| 2016/0342218 A1 | * | 11/2016 | Burba ............ G06F 3/0338 |
| 2017/0361222 A1 | * | 12/2017 | Tsuchiya .......... A63F 13/24 |
| 2020/0246691 A1 | * | 8/2020 | Petersen .......... A63F 13/211 |

OTHER PUBLICATIONS

Paquette et al., unpublished Design U.S. Appl. No. 29/707,790, filed Oct. 1, 2019.

\* cited by examiner

SINGLE HAND CONTROLLER

FIELD OF THE DISCLOSURE

The subject matter of the present disclosure generally relates to controllers, and more particularly relates to a single hand controller.

BACKGROUND OF THE DISCLOSURE

There exists many two-handed controllers which allow users to remotely control equipment. However, operation of these devices using two hands often interrupts the user's situational awareness. Such a loss of situational awareness can be dangerous in certain situations, such as military operations. Further, requiring two hands to operate prohibits military users from employing a weapon for self-defense.

The subject matter of the present disclosure is directed to overcoming, or at least reducing the effects of, one or more of the problems set forth above.

BRIEF SUMMARY OF THE DISCLOSURE

Disclosed is a single handed controller (SHC). The controller body has a generally rectangular cross section when reviewed from above, with front and back surfaces which contour closer together towards a lower end to facilitate holding by a user. The controller has a thumb operated joystick, a proportional plunger operated by a user's index finger, and a series of switches. These controls permit operation of remote equipment, such as unmanned ground vehicles. The controller has a communication interface at a lower surface to allow interconnection with other devices.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

Figure 1:
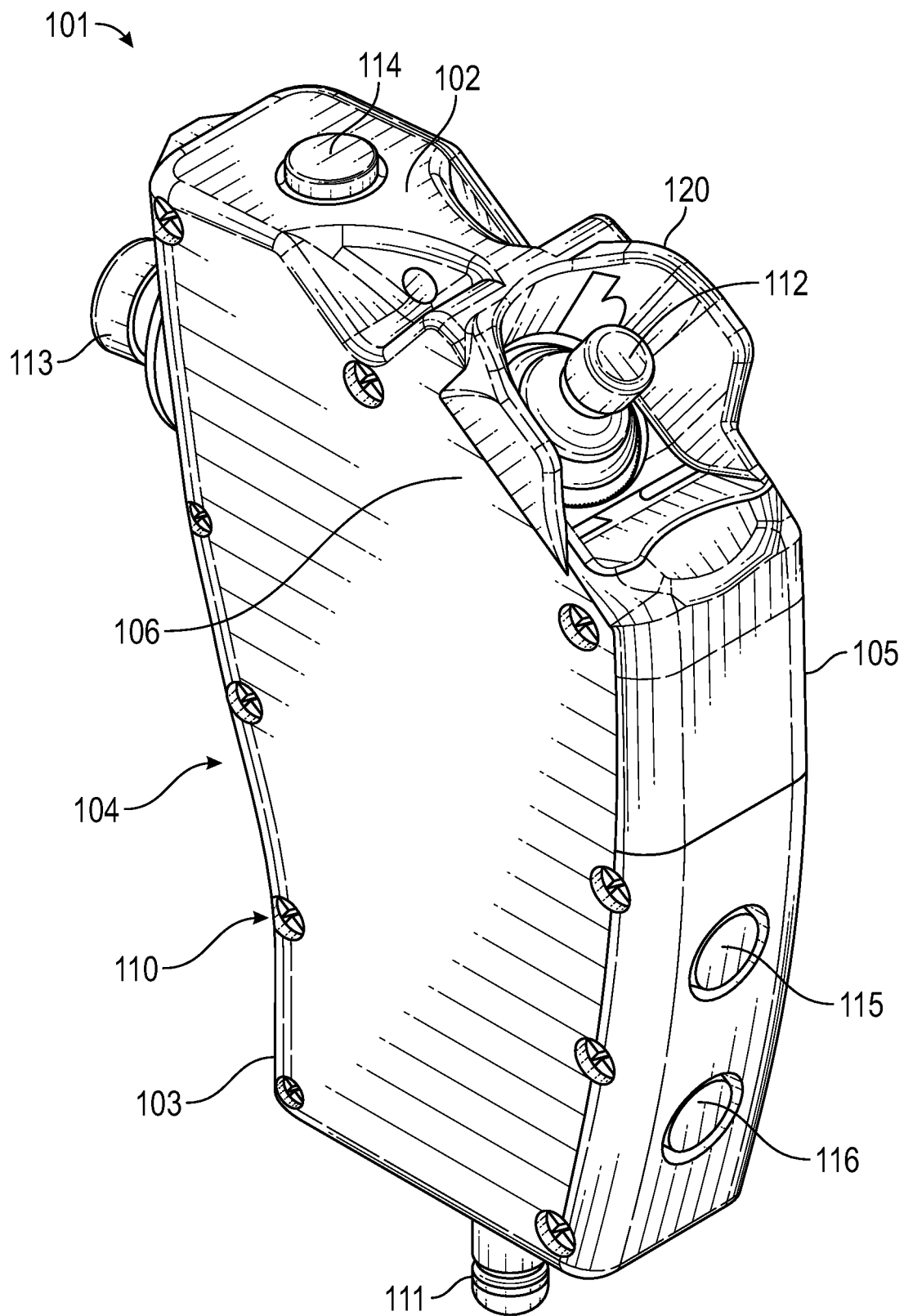
FIG. 1 is a perspective view of a first embodiment.
Figure 2:
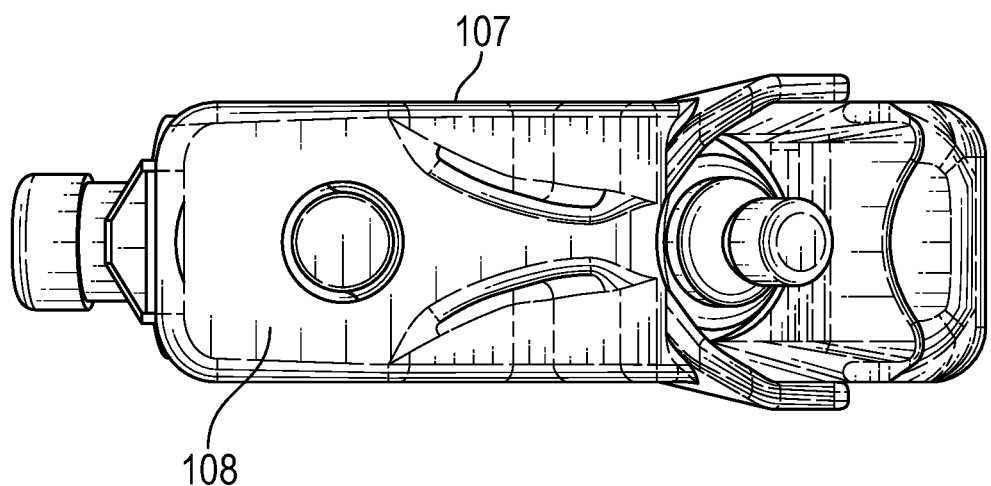
FIG. 2 is a top plan view of the first embodiment.
Figure 3:
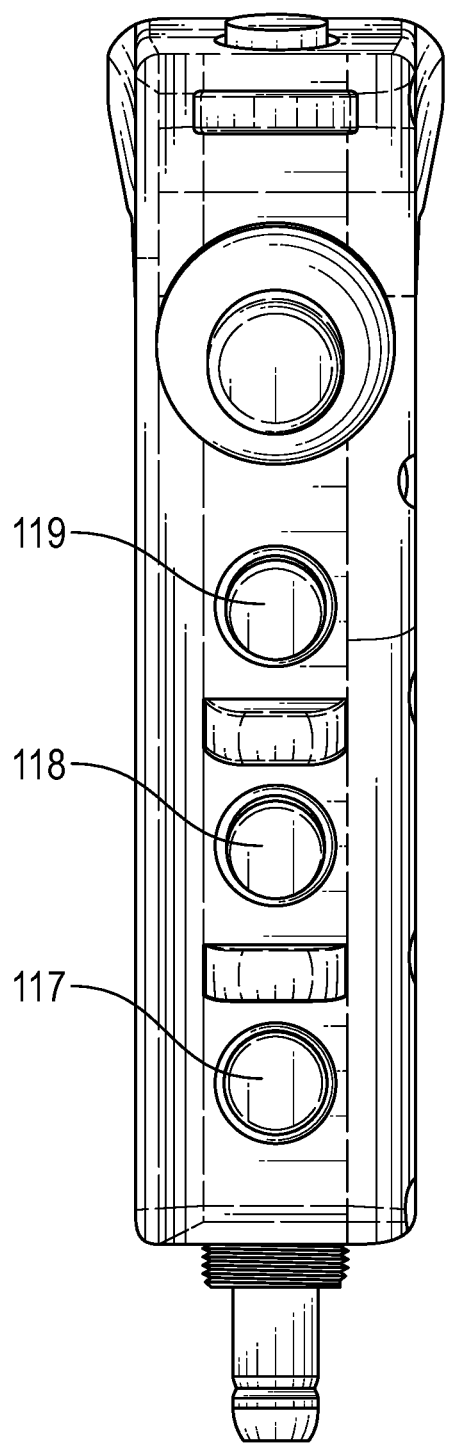
FIG. 3 is a front plan view of the first embodiment.
Figure 4:
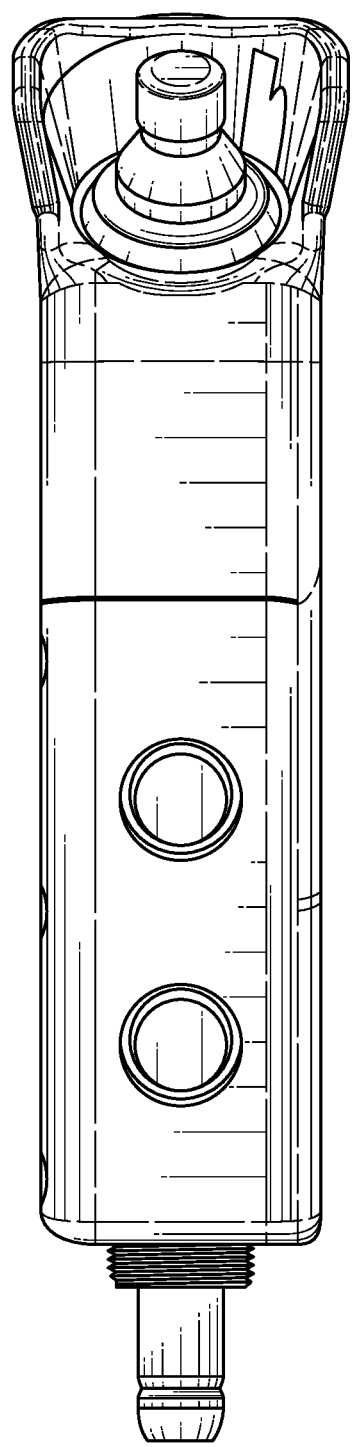
FIG. 4 is a back plan view of the first embodiment.

Described now is a first embodiment. With reference to FIGS. 1-6, Single Hand Controller 101 generally has an upper portion 102 and a lower portion 103. Single Hand Controller 101 has a front surface 104 and back surface 105. There is a first side surface 106 and a second side surface 107 opposite the first side surface. There is an upper surface 108 and a lower surface 109. In the center of the upper surface 108, there is a lanyard hole. In certain embodiments, front surface 104, back surface 105, first side surface 106, upper surface 108 and lower surface 109 are formed as a unitary body, to which second side surface 107 is affixed via a plurality of fixtures 110 passing through holes in the controller body. The fixtures 110 may be coated with an anti-tamper chemical.

There is a communication interface 111, which may be a push/pull connector. A push/pull connector can provide emergency separation to ensure user safety. Alternatively, the communication interface may be threaded or another persistent interconnection. There is a Hall Effect joystick 112 and a Hall Effect proportional plunger 113. In certain embodiments, displacement of the proportional plunger produces a signal increasing linearly in strength with the amount of depression applied by the user. The proportional plunger may alternatively be any displacement taper, such as a logarithmic or custom taper. Other buttons may be employed, such as momentary switches or Single Pole Single Toggle (SPST), Double Pole Single Toggle (DPST), Double Pole Single Toggle (DPST) or Double Pole Double Toggle (DPDT). Switch 114 is positioned on upper surface 102. Switches 115 and 116 are positioned on back surface 105. In the embodiment, Switches 115 and 116 are recessed so as to be guarded from being accidentally actuated by the palm. Switches 117, 118, and 119 are disposed on front surface 104. In certain embodiments, finger separating protrusions 119 provide positive separation of the user's fingers to prevent inadvertent activation of switches, and to provide easy identification by tactile feel without needing visual confirmation. In other embodiments, switches may be disposed in finger grooves. A protective lip 120 surrounds joystick 112 on three sides, so as to prevent inadvertent activation. Switches may be momentary press toggle, on-off toggle, rocker or spring-back toggle switches.

The joystick may be a one, two or three axis joystick. The output of the joystick may have a taper. For example, the joystick may have a region during initial displacement that provides fine motor control, while having beyond that a region that provides a large output for a given displacement. One of ordinary skill in the art to which the present application pertains will appreciate that other tapers may alternatively be employed.

Figure 5:
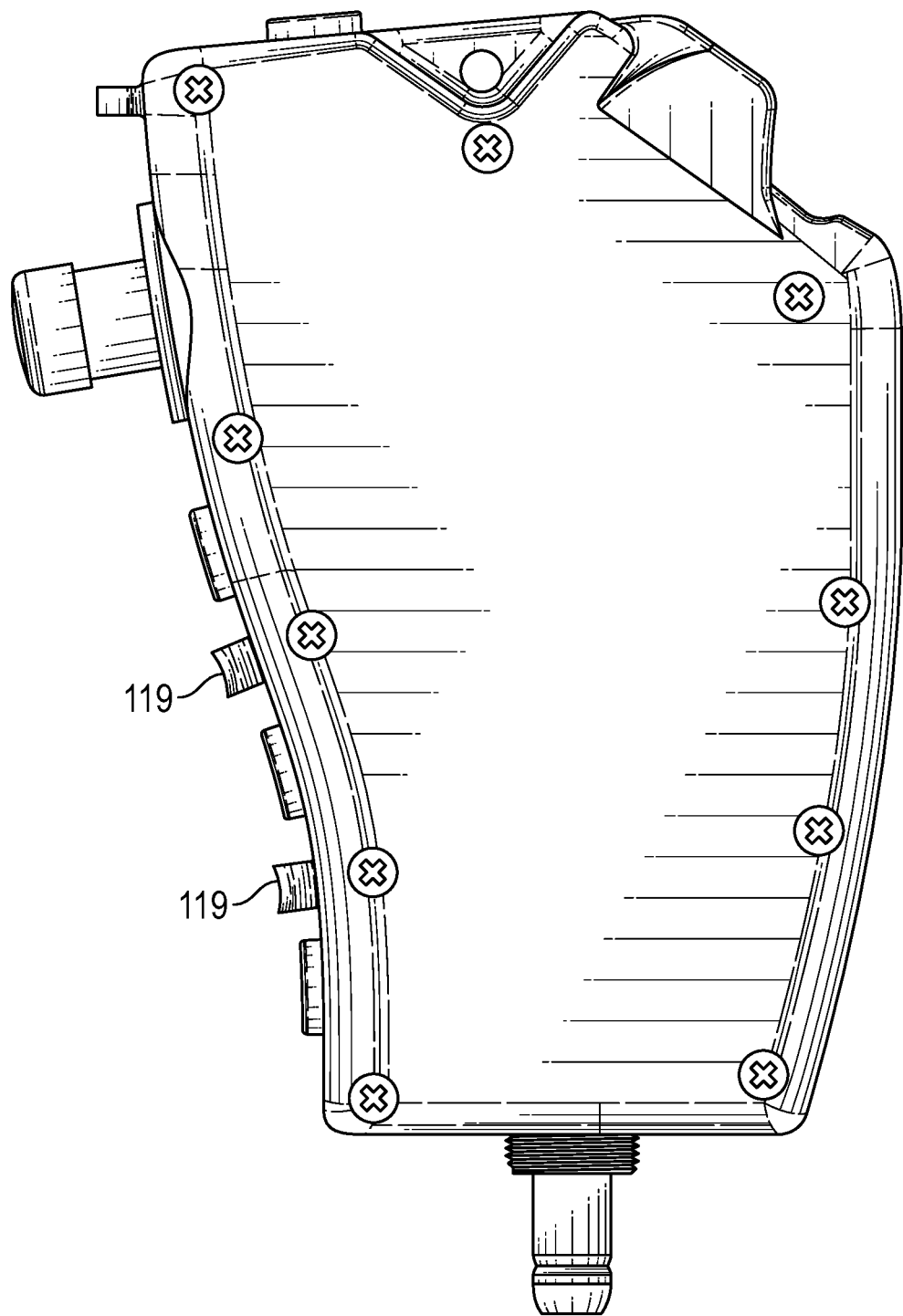
FIG. 5 is a side plan view of the first embodiment.
Figure 6:
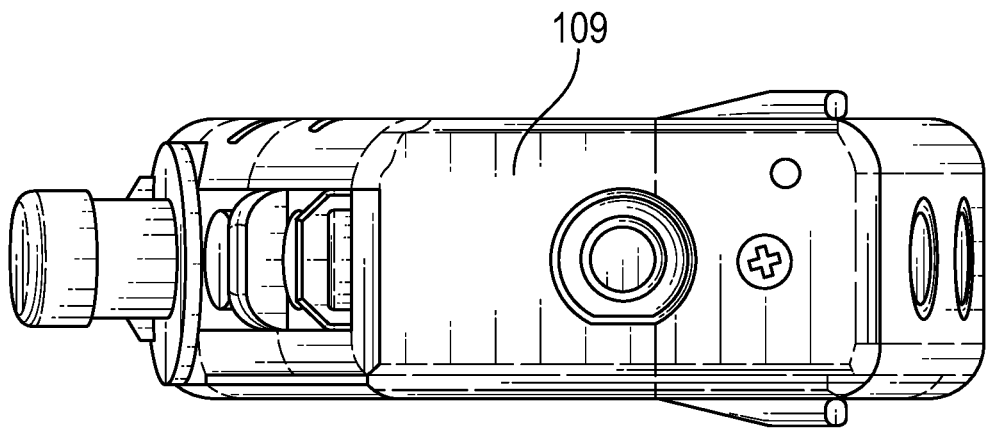
FIG. 6 is a bottom plan view of the first embodiment.
Figure 7:
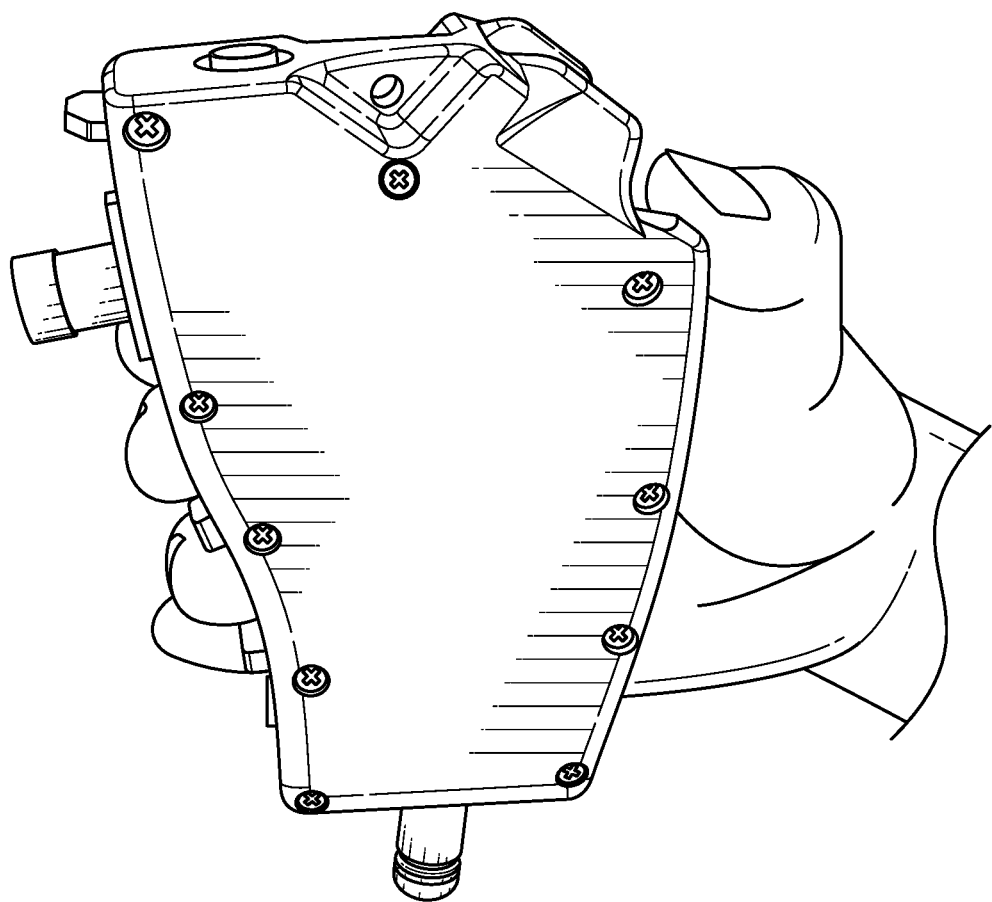
FIG. 7 is a perspective view of the first embodiment in which the controller is held by a user.
Figure 8:
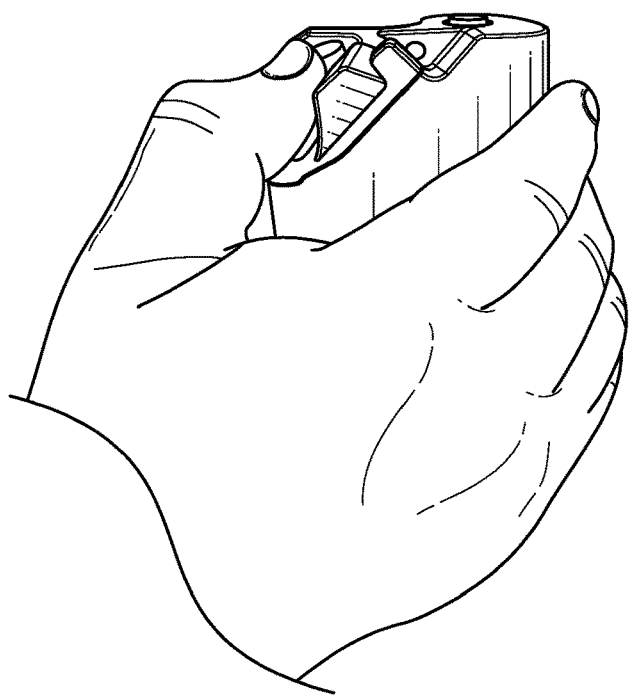
FIG. 8 is a perspective view of the first embodiment in which the joystick of the controller is manipulated by a user.

In the embodiment, the single hand controller is used to control an unmanned vehicle as follows. The user grips the single hand controller 101 with the palm of the hand resting against the second side surface 107, with the fingertips of the hand disposed against the front surface 104. The index finger is configured to operate the proportional plunger switch 113. Switch 119 is operated by the middle finger, Switch 118 is operated by the ring finger and Switch 117 is operated by the pinky finger. The thenar eminence group of muscles on the palm of the user's hand at the base of the thumb grasps the back surface 105, whereby the user's thumb is disposed to operate joystick 112. FIGS. 7-8 depict the manner in which a user may grasp the single hand controller. It should be noted that the design of the single hand controller is symmetrical, and equally suited to left and right handed operation. With reference to FIG. 5, the single hand controller 101 tapers from the upper surface to the lower surface, which accommodates the decreasing size of the fingers of the user's hand, facilitating the ability of the user to grasp the control with a single hand.

The user may enter commands with the controller as follows:
Joystick: Forward/Aft and Right Side/Left Side (either rotation of the orientation or as a direction of movement)
Proportional plunger: Linear Pressure Brake
Switch 115: Toggle Hybrid
Switch 116: Toggle EV
Switch 117: Toggle 4WD
Switch 118: Toggle Lights
Switch 119: Toggle Emergency Stop
Switch 114: Toggle Emergency Stop The above functions may be reassigned or reprogrammed to different functions or to operate with other unmanned vehicles or equipment. For example the controller could be used to aim and operate a weapon system. Further, the linear proportional plunger may be reprogrammed so as to have other than a proportional response, for instance a logarithmic response. The joystick and/or its output may optionally be locked when the proportional plunger is actuated, thereby preventing unwanted movements or outputs during plunger actuation. This may include locking the joystick and/or its output when the proportional plunger begins to be depressed or when the user's finger comes in contact with the proportional plunger.

Now described are characteristics of the operating characteristics of the switches for the embodiment.

Switch Operating Forces

Switches 114-119 require an activation force of 0.5-1.7 lbs and provide tactile feedback. The linear proportional plunger requires an activation force of 3.0-3.8 lbs to fully depress. The joystick requires 0.1-0.45 lbs to fully traverse.

Traverse Distances

Switches 114-119 traverse 0.08 in. during full depression
The linear proportional plunger traverses 0.135-0.160 in. during full depression.
The joystick may be displaced 13° from the center in any direction.

One of ordinary skill in the art to which the present application pertains will appreciate that these numbers are for an embodiment. Other pressures, and displacement values may optionally be employed.

Figure 9:
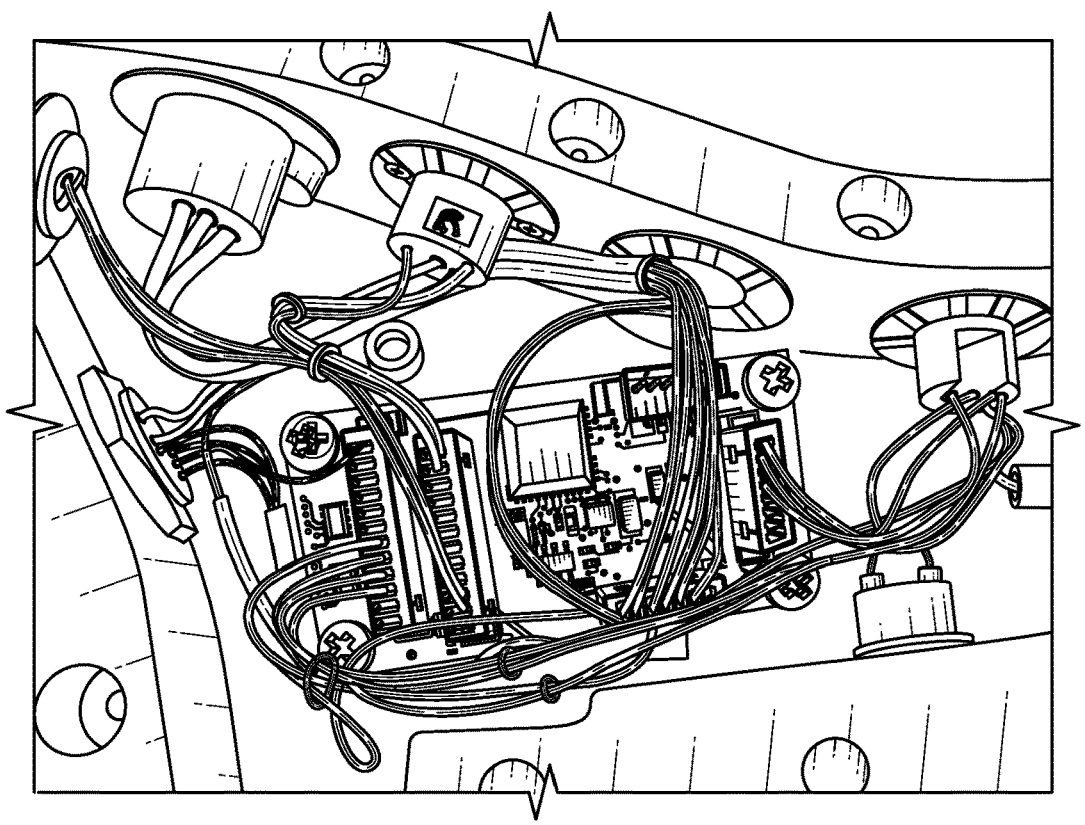
FIG. 9 is a perspective view of the first embodiment showing the internal layout of the control processing electronics.

FIG. 9 depicts internal control processing electronics, which may operate according to USB, RS422 and/or RS232 or any other physical or virtual data communications protocol over a any variety of electrical signaling mediums.

Exemplary USB Bit Table

| Description | USB Usage Page | USB Usage ID | USB Usage Name |
|---|---|---|---|
| Joystick X Axis | 0x01 | 0x30 | X |
| Joystick Y Axis | 0x01 | 0x31 | Y |
| Plunger Proportional | 0x01 | 0x33 | Rx |
| Switch 1 Palm Facing Upper | 0x09 | 1 | Button 1 |
| Switch 2 Palm Facing Lower | 0x09 | 2 | Button 2 |
| Switch 3 Pinky Finger | 0x09 | 3 | Button 3 |
| Switch 4 Ring Finger | 0x09 | 4 | Button 4 |
| Switch 5 Middle Finger | 0x09 | 5 | Button 5 |
| Switch 6 Fore Finger | 0x09 | 6 | Button 6 |

In other embodiments, alternative interfaces from USB may be employed, for instance a CAN bus, ethernet, internet protocol, wireless, radio, etc.

The single hand controller may be contoured for single hand operation such that an operator, for example, can operate the joystick while simultaneously operating the proportional plunger to activate a brake/gas and power over trail obstacles. The single hand controller is also of a size so as to be easily concealed both when stowed or in operation. Further, a user may employ two single hand controllers, each in one hand, providing greater control of one piece of equipment or simultaneous control of multiple pieces of equipment. The single hand controller may mimic the stock of common weaponry used by military person so as to be recognizable and easy to grip. The single hand controller is contoured to allow a comfortable grip with the pinky, ring, and/or middle fingers, allowing full access to a joystick and proportional plunger with the thumb and pointer finger. A user may therefore operate three axes simultaneously.

FIG. 9 details the internal structure of the single hand controller embodiment.

Figure 10:
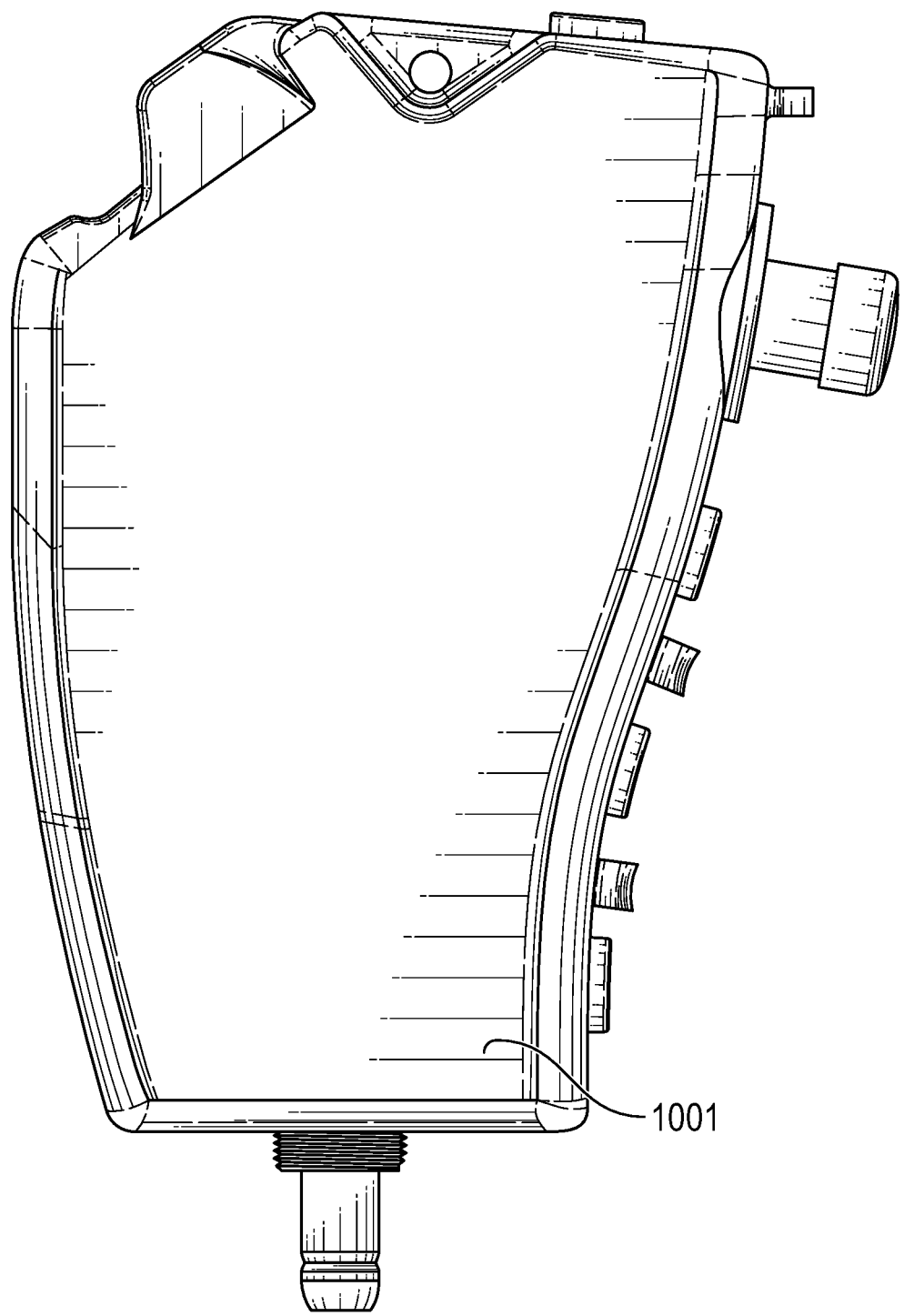
FIG. 10 is a second side plan view of the first embodiment.

FIG. 10 depicts a two piece construction for the single hand controller embodiment, wherein securement screws are inserted through the side of the controller depicted in FIG. 5 and secured to side plate 1001.

Figure 11:
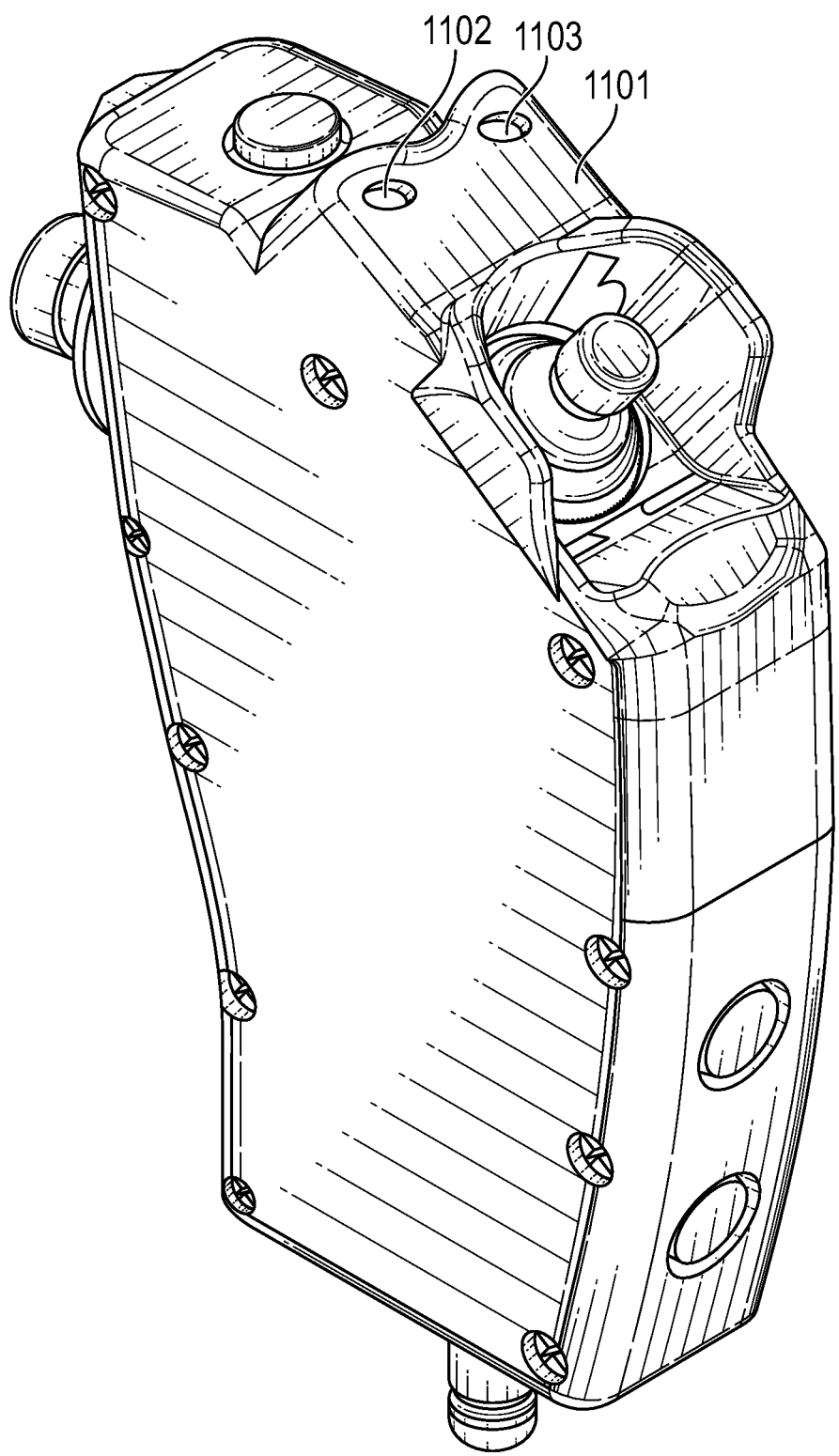
FIG. 11 is a perspective view of a second embodiment having LED indicator lights.
Figure 12:
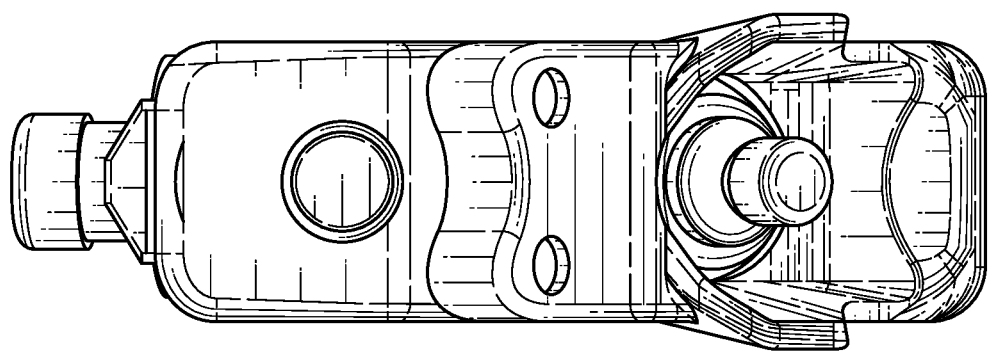
FIG. 12 is a top plan view of the second embodiment.
Figure 13:
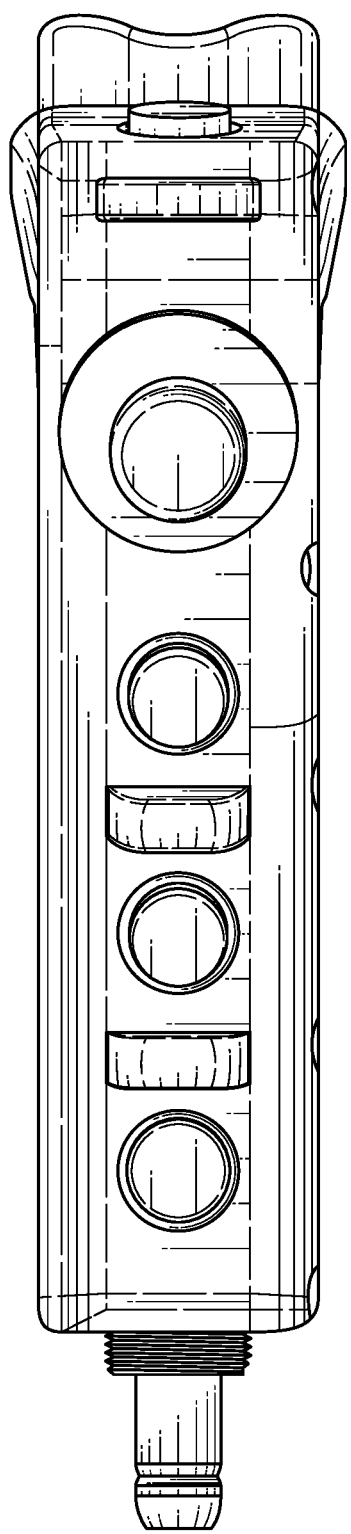
FIG. 13 is a front plan view of the second embodiment.
Figure 14:
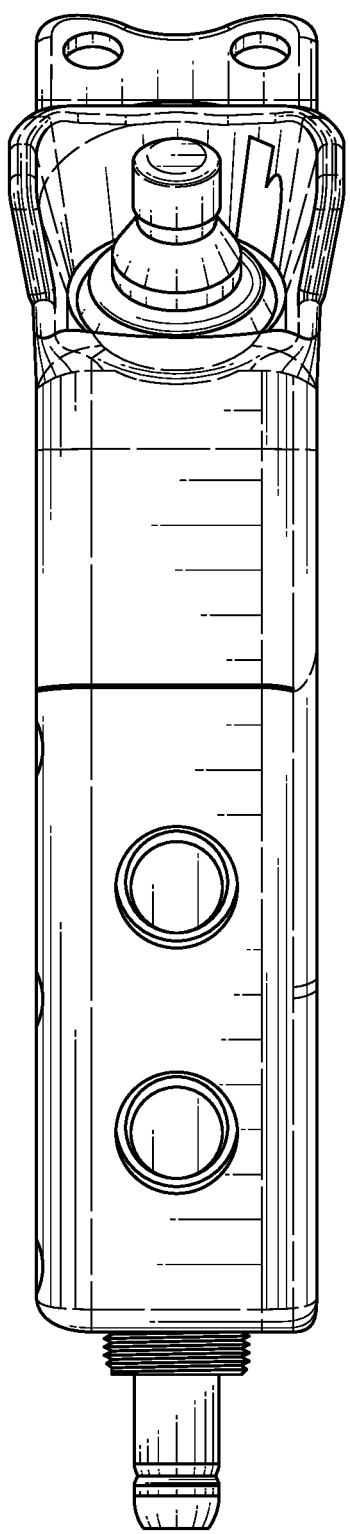
FIG. 14 is a back plan view of the second embodiment.
Figure 15:
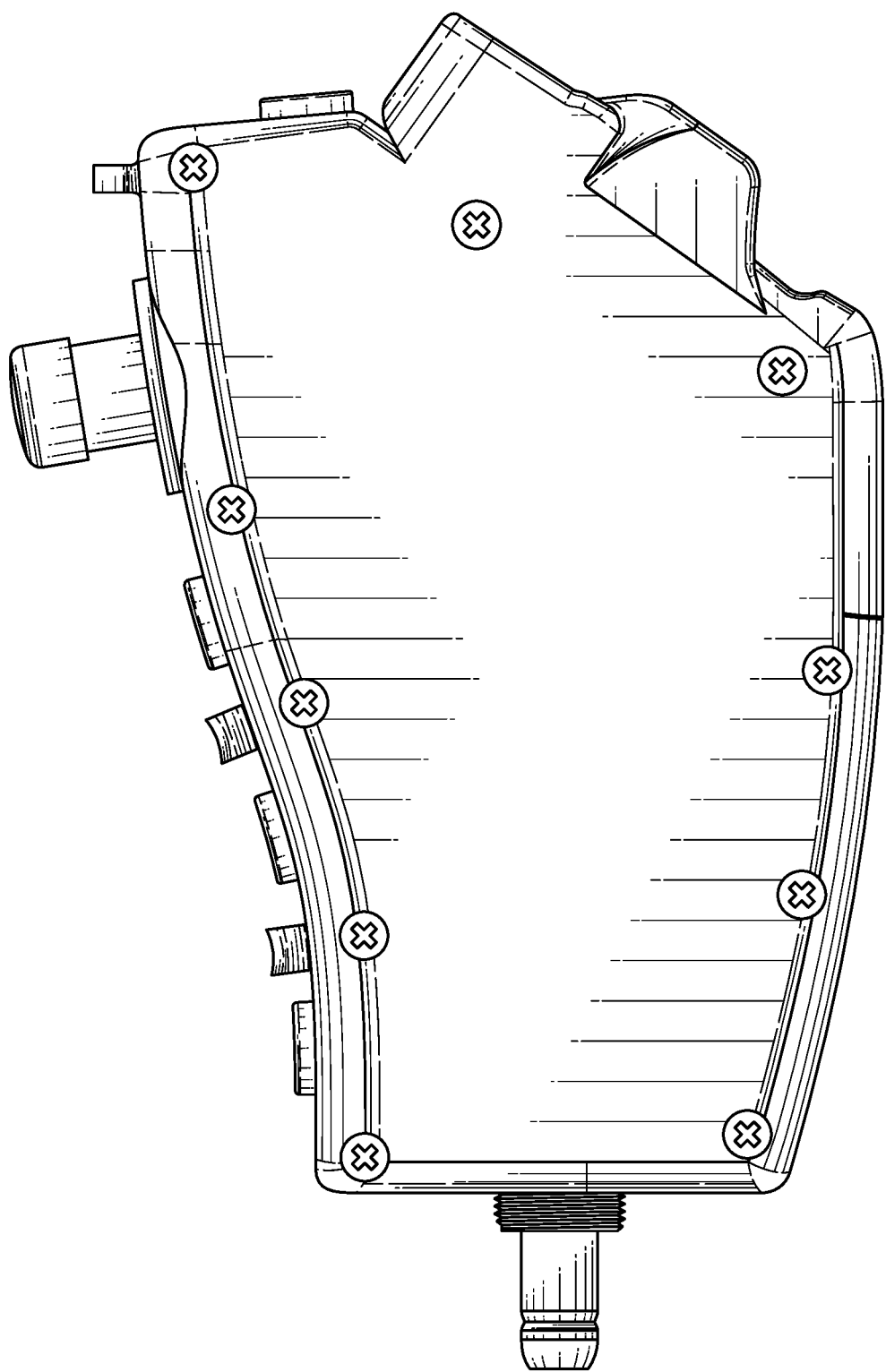
FIG. 15 is a second side plan view of the second embodiment.

FIG. 11 depicts a second embodiment single hand controller embodiment, having a housing 1101 containing a first indicator light 1102 and a second indicator light 1103. The illuminated surfaces of the first indicator light 1102 and second indicator light 1103 may be recessed into the housing 1101 so they are visible to the operator of the unit but less or not visible from angles such as from the side of the unit. It should be appreciated that a different number of indicator lights may also be employed. In certain embodiments, the indicator lights may indicate one or of that a break has been employed or throttle has been employed. FIGS. 12-15 depict additional views of the embodiment of FIG. 11.

Figure 16:
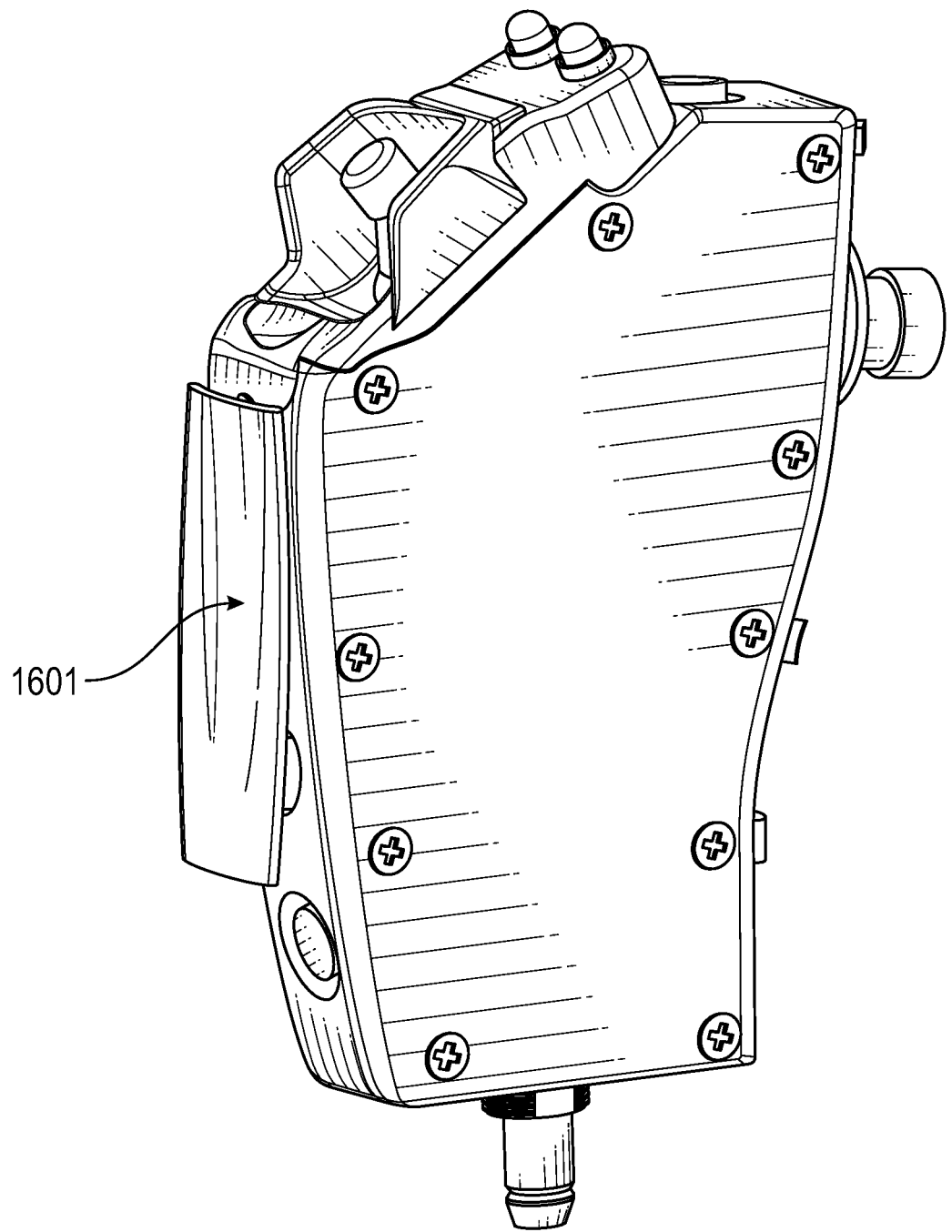
FIG. 16 is a perspective view of a third embodiment having a palm safety activator switch.
Figure 17:
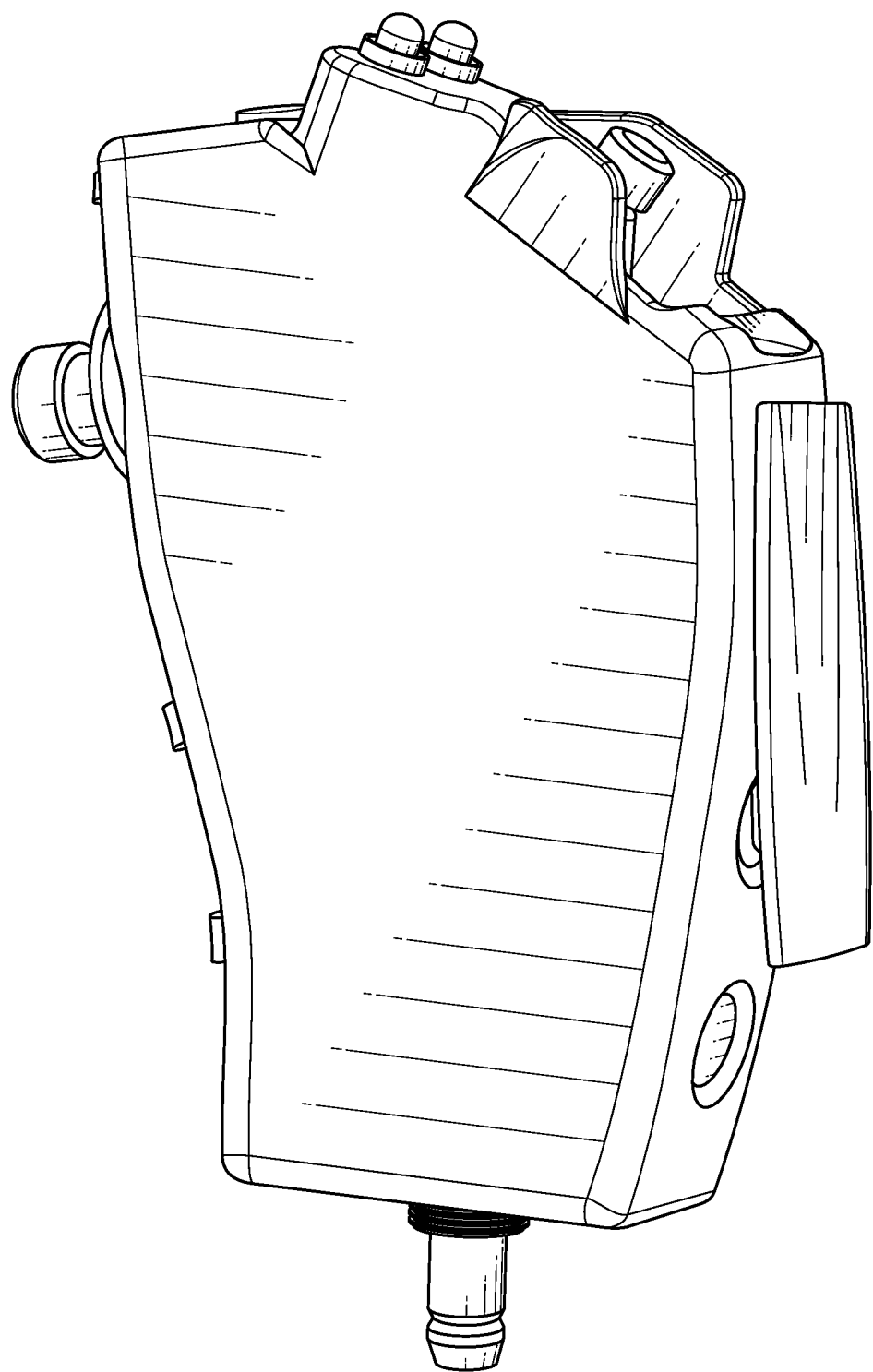
FIG. 17 is another perspective view of the third embodiment.

FIG. 16 depicts a third embodiment having including a palm safety actuator 1601. In certain embodiments, the palm safety actuator must be depressed by the user's palm to enable one or more functionalities, such that if the user drops or otherwise loses control of the single hand controller it those functionalities are automatically disabled. In other embodiments, the safety actuator may be a shield that must be flipped up to gain access to a switch or button underneath. FIG. 16 also depicts indicator lights protruding from a housing rather than being recessed. FIG. 17 is another view of the embodiment of FIG. 16.

In a demonstrated embodiment, the width of the body of the single hand controller from one side to the other is 1.20 inches, the distance from the most extensive surface from the back of the single hand controller to the forwardmost proportional plunger is 3.52 inches, the height of the single hand controller from the uppermost surface to the bottom most surface excluding the communication interface is 4.47 and the height of the single hand controller from the uppermost surface to the bottom most surface of the communication interface is 5.18 inches.

The terms "bottom", "below", "top" and "above" as used herein do not necessarily indicate that a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A single hand controller, comprising:
a front surface and a back surface, having disposed between a first and second side surface;
a lower surface interconnected with the front surface, back surface and first and second side surfaces;
an upper surface interconnected with the front surface, back surface and first and second side surfaces;
the upper surface has disposed thereon a joystick;
the front surface has disposed therein a push button and at least one switch; and
a palm safety actuator disposed on the back surface enabling at least one functionality when depressed;
wherein the front surface, back surface, first side surface and second side surface are shaped such that when a user places a first through fourth digits of a hand against the front surface and a thenar eminence of the hand against the back surface, the user's thumb is disposed against the joystick and the user's second digit is disposed against the push button.

2. The single hand controller of claim 1, wherein the at least one switch in the front surface is three switches.

3. The single hand controller of claim 2, wherein the upper surface further has disposed therein a switch.

4. The single hand controller of claim 3, wherein the back surface has disposed therein at least one switch.

5. The single hand controller of claim 1, wherein the upper surface has disposed therein at least one switch.

6. The single hand controller of claim 1, wherein joystick is disposed on a portion of the upper surface that is angled with respect to the bottom surface.

7. The single hand controller of claim 6, wherein a shroud surrounds the joystick on at least three sides.

8. The single hand controller of claim 1 further comprising internal control processing electronics located within an enclosure and configured to interpret user inputs to the joystick, push button and switches.

9. The single hand controller of claim 1 wherein the push button is a linear push button.

10. The single hand controller of claim 9 wherein the push button is a Hall Effect push button and the joystick is a Hall Effect joystick.

11. The single hand controller of claim 1, wherein the front surface and back surface are tapered so as to be closer to one another at the bottom surface than at the top surface.

12. The single hand controller of claim 1 wherein the combination of the joystick and the push button is configured to control a vehicle in three axes.

13. The single hand controller of claim 1 wherein the upper surface has at least one light source disposed therein and being configured to indicate a condition.

14. A single hand controller, comprising:
an enclosure having a front wall and a back wall contoured with respect to one another, the front wall having disposed therein a linear push button and a plurality of switches and the back wall having at least one switch;
the enclosure further having an upper surface having a slanted portion having disposed therein a joystick, the upper surface further having a switch;
the enclosure further having a lower surface having disposed therein a communication interface; and
the enclosure having disposed in an internal cavity a microprocessor, the microprocessor configured to receive inputs to the joystick, the linear push button and the plurality of switches and produce USB signals;
a palm safety actuator disposed on the back surface that enables at least one functionality when depressed; and
wherein the front wall and back wall are disposed and tapered relative to one another such that when a thumb of a user is disposed against the joystick a plurality of fingers of the user are disposed against the linear push button and the plurality of switches.

15. The single hand controller of claim 14 wherein each switch of the plurality of switches on the front wall has disposed there between a finger separator element.

16. The single hand controller of claim 14 wherein the linear push button is a Hall Effect linear push button and the joystick is a Hall Effect joystick.

17. The single hand controller of claim 14 wherein each switch of the plurality of switches is a toggle switch.

18. The single hand controller of claim 14 wherein the joystick is configured to control forward and backward movement of a remote control vehicle.

19. The single hand controller of claim 16 wherein the linear push button is configured to control the brake of the remote control vehicle.

20. The single hand controller of claim 17 wherein a switch disposed in the upper surface is configured to toggle an emergency stop.

21. The single hand controller of claim 14 further comprising a housing disposed on the upper surface including at least one recessed indicator light.

22. A single hand controller, comprising:
a front surface and a back surface, a first and second side surface;
a lower surface interconnected with the front surface, back surface and first and second side surfaces;
an upper surface interconnected with the front surface, back surface and first and second side surfaces;
the upper surface has disposed thereon a Hall Effect joystick and a switch;
the front surface has disposed therein a linear Hall Effect push button and three switches;
a palm safety actuator disposed on the back surface enabling at least one functionality when depressed; and
wherein the front surface and back surface are contoured with respect to one another whereby a user grasping the single hand controller can simultaneously access the joystick with a thumb and the linear Hall Effect push button via a second digit and the three switches with a third, a fourth and a fifth digit.

* * * * *